United States Patent
Takano

(10) Patent No.: US 10,652,570 B2
(45) Date of Patent: May 12, 2020

(54) MOVING IMAGE ENCODING DEVICE, MOVING IMAGE ENCODING METHOD, AND RECORDING MEDIUM FOR RECORDING MOVING IMAGE ENCODING PROGRAM

(71) Applicant: NEC Corporation, Tokyo (JP)

(72) Inventor: Fumiyo Takano, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 132 days.

(21) Appl. No.: 16/070,041

(22) PCT Filed: Jan. 10, 2017

(86) PCT No.: PCT/JP2017/000387
§ 371 (c)(1),
(2) Date: Jul. 13, 2018

(87) PCT Pub. No.: WO2017/122604
PCT Pub. Date: Jul. 20, 2017

(65) Prior Publication Data
US 2019/0028732 A1    Jan. 24, 2019

(30) Foreign Application Priority Data

Jan. 15, 2016  (JP) ................................. 2016-006276

(51) Int. Cl.
*H04N 19/52* (2014.01)
*H04N 19/176* (2014.01)
(Continued)

(52) U.S. Cl.
CPC .......... *H04N 19/52* (2014.11); *H04N 19/107* (2014.11); *H04N 19/109* (2014.11); *H04N 19/11* (2014.11);
(Continued)

(58) Field of Classification Search
CPC .... H04N 19/107; H04N 19/109; H04N 19/11; H04N 19/124; H04N 19/147;
(Continued)

(56) References Cited

U.S. PATENT DOCUMENTS

| 5,841,476 A | 11/1998 | Takishima et al. |
| 2008/0008242 A1 | 1/2008 | Lu et al. |

(Continued)

FOREIGN PATENT DOCUMENTS

| JP | 08-307880 A | 11/1996 |
| JP | 2006-157208 A | 6/2006 |

(Continued)

OTHER PUBLICATIONS

Gan et. al. "Fast Mode Decision for H.264/AVC Encoding of Tunnel Surveillance Video" Jun. 13-19, 2010, Second International Conferences on Advances in Multimedia.*
(Continued)

*Primary Examiner* — Mohammed S Rahaman
(74) *Attorney, Agent, or Firm* — Sughrue Mion, PLLC

(57) ABSTRACT

Provided is a moving image encoding device which is capable of determining an encoding mode through a small amount of calculation while suppressing a deterioration in encoding efficiency. In the present invention, a moving image encoding device includes an encoding mode determining unit for determining a combination of a plurality of encoding modes for each block.

10 Claims, 7 Drawing Sheets

(51) Int. Cl.
*H04N 19/147* (2014.01)
*H04N 19/107* (2014.01)
*H04N 19/109* (2014.01)
*H04N 19/11* (2014.01)
*H04N 19/124* (2014.01)
*H04N 19/159* (2014.01)
*H04N 19/182* (2014.01)
*H04N 19/186* (2014.01)
*H04N 19/44* (2014.01)

(52) U.S. Cl.
CPC ......... *H04N 19/124* (2014.11); *H04N 19/147* (2014.11); *H04N 19/159* (2014.11); *H04N 19/176* (2014.11); *H04N 19/182* (2014.11); *H04N 19/186* (2014.11); *H04N 19/45* (2014.11)

(58) Field of Classification Search
CPC .. H04N 19/159; H04N 19/176; H04N 19/182; H04N 19/186; H04N 19/45; H04N 19/52
See application file for complete search history.

(56) References Cited

U.S. PATENT DOCUMENTS

| | | | |
|---|---|---|---|
| 2008/0225947 | A1 | 9/2008 | Narroschke et al. |
| 2010/0149424 | A1* | 6/2010 | Yoon ..................... H04N 5/147 348/700 |
| 2012/0177299 | A1 | 7/2012 | Kato et al. |
| 2013/0022102 | A1* | 1/2013 | Casula ................. H04N 19/176 375/240.02 |

FOREIGN PATENT DOCUMENTS

| | | |
|---|---|---|
| JP | 2008-519503 A | 6/2008 |
| JP | 2008-187220 A | 8/2008 |
| JP | 2010-521113 A | 6/2010 |
| JP | 2011-151546 A | 8/2011 |
| JP | 2012-142886 A | 7/2012 |
| JP | 4968726 B2 | 7/2012 |
| JP | 2015-139013 A | 7/2015 |

OTHER PUBLICATIONS

Yong-lin et.al. "A Fast CU Coding Mode Decision Algorithm for H.265/HEVC" Nov. 2015, Tencon 2015-2015 IEEE Region 10 Conference.*
Zhang et. al. "Fast Mode Decision for H.264 Video Coding in Packet Loss Environment", Sep. 2011, 2011 18th IEEE International Conference on Image Processing.*
Maarif et. al. "Fast Mode Decision for Scalable Video Coding over Wireless Network" May 2010, International Conference on Computer and Communication Engineering (ICCCE 2010), May 11-13, 2010, Kuala Lumpur, Malaysia.*
Chan et. al. "On-Line Statistical Analysis Based Fast Mode Decision for Multi-View Video Coding" 28th Picture Coding Symposium, PCS2010, Dec. 8-10, 2010, Nagoya, Japan.*
Wu et. al. "The Motion Attention Directed Fast Mode Decision for Spatial and CGS Scalable Video Coding", Mar.-Apr. 2008, 2008 IEEE International Symposium on Broadband Multimedia Systems and Broadcasting.*
ITU-T Recommendation H.265, "High efficiency video coding," Apr. 2013, 317 pages.
Huanqiang Zeng et al., "Fast Mode Decision for H.264/AVC Based on Macroblock Motion Activity," IEEE Transactions on Circuits and Systems for Video Technology, Apr. 2009, pp. 1-11, vol. 19, No. 4.
Written Opinion of the International Searching Authority of PCT/JP2017/000387 dated Apr. 11, 2017.
International Search Report of PCT/JP2017/000387 dated Apr. 11, 2017.

* cited by examiner

MOVING IMAGE ENCODING DEVICE, MOVING IMAGE ENCODING METHOD, AND RECORDING MEDIUM FOR RECORDING MOVING IMAGE ENCODING PROGRAM

CROSS REFERENCE TO RELATED APPLICATIONS

This application is a National Stage of International Application No. PCT/JP2017/000387 filed Jan. 10, 2017, claiming priority based on Japanese Patent Application No. 2016-006276 filed Jan. 15, 2016, the disclosure of which is incorporated herein in its entirety by reference.

TECHNICAL FIELD

The present invention relates to a moving image encoding device, a moving image encoding method, and a storage medium for storing a moving image encoding program, capable of reducing an amount of calculation without lowering encoding efficiency.

BACKGROUND ART

In a standard specification of moving image encoding, an image is divided into multiple pixel blocks, and a pixel of a block to be encoded is predicted by using a pixel in the same screen (frame) or a pixel in a different frame for each block. Then, only a difference (residual) between an actual pixel and a predicted pixel is encoded to compress information. Note that, examples of the standard specification include H.264/Moving Picture Experts Group (MPEG)-4 AVC (hereinafter H.264) and H.265/HEVC (hereinafter H.265), and NPL 1 proposes a method for compressing information based on the H.265 standard.

In H.265 moving image encoding processing, encoding is performed in a block unit of 64×64 pixels maximum, which is called a coding tree unit (CTU). The CTU is further divided into coding units (CUs) having a variable size, and prediction processing is performed on each CU. Note that, the CU size can be changed from 64×64 up to 8×8 pixels. Then, each of the CUs selects any one of an intra prediction mode, an inter prediction mode, and a skip mode, and performs prediction processing and encoding processing.

Hereinafter, terms of a frame that has been encoded (or an encoded frame) and a reference frame may be used. The encoded frame means a frame in which encoding processing has been performed before on a frame in which current encoding processing is performed. Then, the reference frame is such an encoded frame and a frame to be used in current prediction processing.

The intra prediction mode is a mode of predicting a block to be encoded by using an encoded pixel in a frame and encoding a prediction direction and a prediction residual.

The inter prediction mode is a mode of predicting a block to be encoded by using a pixel in a reference frame and encoding motion information and a prediction residual to the reference frame.

The skip mode is one kind of inter predictions that predict a pixel by using a reference frame but is a special mode of not encoding motion information and a prediction residual. In H.265, motion information is copied and encoded from a motion vector list (merge list) generated from an adjacent block. The skip mode is an important prediction mode that has a high possibility of being selected and greatly contributes to encoding efficiency. However, since a motion vector (skip vector or an amount of travel) is selected from five candidates (skip vector candidates) at the maximum, an amount of calculation increases when mode determining processing is performed on all the skip vector candidates.

Note that, presence or absence of a residual may be specified in each color component separately from (independently of) the prediction mode. Although image quality deteriorates by compulsorily setting a residual to zero, there is an advantage that an amount of codes can be reduced.

FIG. 6 illustrates an example of a configuration of a moving image encoding device 100 based on the H.265 standard. The moving image encoding device 100 includes a transform quantization unit 101, an encoding unit 102, an inverse transform-inverse quantization unit 103, a synthesizer 104, a loop filter 105, a frame buffer 106, an encoding mode determining unit 107, an intra prediction unit 108, an inter prediction unit 109, and an adder 110.

Then, the moving image encoding device 100 runs as follows. First, the encoding mode determining unit 107 determines a CU size and also determines which mode of the intra prediction mode, the inter prediction mode, and the skip mode is used for an input image G1. At this time, when the intra prediction mode is determined, a prediction direction is also determined. Further, when the inter prediction mode or the skip mode is determined, motion information is also determined.

The intra prediction unit 108 or the inter prediction unit 109 generates a prediction image G2 according to the determined mode. The prediction image G2 is input to the adder 110, and a difference between the input image G1 and the prediction image G2 is obtained. The obtained difference is input as a residual signal G3 to the transform quantization unit 101.

The transform quantization unit 101 transforms the residual signal G3 into an integer and further quantizes a transformed factor. The quantized factor is output as a quantization transform signal G4 to the encoding unit 102 and the inverse transform-inverse quantization unit 103.

The encoding unit 102 encodes and outputs the quantization transform signal G4. On the other hand, the inverse transform-inverse quantization unit 103 inversely quantizes the quantization transform factor G4 and then inversely transforms the quantization transform factor G4 into an integer, and outputs the integer as an inverse quantization transform signal G5 to the synthesizer 104.

The synthesizer 104 synthesizes the inverse quantization transform signal G5 and the prediction image G2, and outputs this as a rebuilt image G6 to the loop filter 105, the encoding mode determining unit 107, and the intra prediction unit 108.

The loop filter 105 removes a block distortion from the rebuilt image G6 and stores the rebuilt image G6 in the frame buffer 106. The frame buffer 106 outputs the stored rebuilt image G6 to the inter prediction unit 109 in response to a request.

The intra prediction unit 108 performs an intra prediction of the same frame by using the rebuilt image G6. Further, the inter prediction unit 109 performs an inter prediction by using the rebuilt image G6 from which the block distortion is removed.

The encoding mode determining unit 107 determines a mode by using the rebuilt image G6. In general, it is important to combine a CU size, a prediction mode, and presence or absence of a residual optimally by the encoding mode determining unit 107 in order to achieve a high degree of encoding efficiency. Thus, a technique called a rate-distortion (RD) optimization is widely used in recent moving image encoding devices.

In the RD optimization, a rate-distortion (RD) cost expressed by J=D+λR is calculated for each encoding mode, and a combination having the smallest RD cost is adopted. Herein, D is an amount of distortion due to encoding, R is an amount of codes generated by encoding, and λ is a weighting factor depending on complexity of an image or the like.

A sum of squared error (SSE) of a pixel of the input image G1 and a pixel of the rebuilt image G6 is used as the amount of distortion D.

However, calculation of the amount of distortion D and the amount of codes R requires a lot of processing such as transform and quantization, encoding, and inverse transform and inverse quantization of a difference between the prediction image G2 and the input image G1, thereby increasing an amount of calculation.

In addition, H.265 has new tools such as variety of encoding block sizes, an expansion of an intra prediction direction, and rate-distortion optimized quantization (RDOQ) added to H.264. Thus, the number of combinations of encoding modes significantly increases in H.265, thereby increasing an amount of calculation.

Particularly in a high-resolution image such as 4K, processing of calculating and comparing RD costs of combinations of all encoding modes is unrealistic in terms of an obtained effect. In other words, wasted processing increases. Note that, the RD cost is expressed by magnitude of a prediction residual of an input image and weighting addition of an amount of data to be generated. Therefore, when a block size having the smallest RD cost is selected, an optimum balance between objective image quality and the amount of data can be achieved.

FIG. 7 is a block diagram of the above-mentioned encoding mode determining unit 107. The encoding mode determining unit 107 includes a skip information determining unit 121, an inter prediction information determining unit 122, and an intra prediction information determining unit 123. The encoding mode determining unit 107 further includes a sub-block cost calculating unit 124, an inter residual removal determining unit 125, an intra residual removal determining unit 126, and a mode determining unit 127.

Note that, a current image, a reference frame, and a skip vector candidate are input to the skip information determining unit 121. A current image and a reference frame are input to the inter prediction information determining unit 122. A current image and a rebuilt image are input to the intra prediction information determining unit 123.

The skip information determining unit 121 generates the prediction image G2 by a reference frame for a plurality of skip vector candidates generated from motion information in a close block. Then, the skip information determining unit 121 performs transform and quantization, encoding, and inverse transform and inverse quantization on the prediction image G2 and a current image as an encoding target to obtain an RD cost. Subsequently, the skip information determining unit 121 selects a skip vector candidate having the smallest RD cost among a plurality of skip vector candidates and outputs the skip vector candidate together with the RD cost.

The inter prediction information determining unit 122 determines motion information by a motion vector search that estimates an amount of motion of an image. Then, the inter prediction information determining unit 122 generates the prediction image G2 from a current image and a reference frame, based on the determined motion information, obtains an RD cost, and outputs the RD cost together with the motion information.

The intra prediction information determining unit 123 selects a direction having the smallest RD cost among multiple prediction directions and outputs the direction together with the RD cost in the selected prediction direction.

The sub-block cost calculating unit 124 obtains a total of RD costs of included sub-blocks. For example, when a CU size is 16×16, it is assumed that four 8×8 CUs generated by dividing the 16×16 CU are sub-blocks and a total of RD costs thereof is a sub-block cost.

In the inter prediction mode, the inter residual removal determining unit 125 calculates an RD cost when a residual (namely, a transform factor) is compulsorily set to zero, and selects a residual zero mode when the cost is smaller than a cost having a residual.

In the intra prediction mode, the intra residual removal determining unit 126 calculates an RD cost when a residual (namely, a transform factor) is compulsorily set to zero, and selects a residual zero mode when the cost is smaller than a cost having a residual.

Hereinafter, an RD cost calculated by the skip information determining unit 121 is described as a skip RD cost, an RD cost calculated by the inter prediction information determining unit 122 is described as an inter RD cost, an RD cost calculated by the intra prediction information determining unit 123 is described as an intra RD cost, an RD cost calculated by the inter residual removal determining unit 125 is described as an inter residual RD cost, an RD cost calculated by the intra residual removal determining unit 126 is described as an intra residual RD cost, and an RD cost calculated by the sub-block cost calculating unit 124 is described as a sub RD cost. Then, when these are collectively called, it is simply described as an RD cost.

Then, the mode determining unit 127 compares an RD cost in the skip mode, the inter prediction mode, and the intra prediction mode with a sub RD cost, selects a minimum mode, and determines a prediction mode. The determined prediction mode and the RD cost are used as a sub RD cost of a greater CU.

Such processing requires a lot of calculation, and therefore PTL 1 and NPL 2 disclose technologies for reducing an amount of calculation by limiting an encoding mode to calculate an RD cost.

In PTL 1, an amount of calculation is reduced by limiting an encoding mode being evaluated based on an RD cost in some encoding modes under H.264. This technology, for example, first calculates a skip RD cost in a 16×16-pixel skip mode and an inter RD cost in a 16×16-pixel inter prediction mode. Then, an encoding mode is determined without evaluating the inter prediction mode having a smaller size when the skip RD cost is smaller than the inter RD cost, the 16×16-pixel inter prediction mode has no residual, and the skip mode and the inter prediction mode have the same motion information. Thus, the number of modes that may be used, that is, processing of calculating an RD cost, can be reduced.

Further, NPL 2 discloses a technology for first evaluating a skip RD cost, and determining, when the cost is equal to or less than a fixed threshold, a skip mode without evaluating other modes. Also in this case, processing of calculating an RD cost of other modes can be reduced based on a skip RD cost.

CITATION LIST

Patent Literature

[PTL 1] Japanese Patent No. 4968726

Non Patent Literature

[NPL 1] ITU-T Recommendation H.265 "High efficiency video coding," April 2013.
[NPL 2] H. Zeng, et. al., "Fast mode decision for H.264/AVC based on macroblock motion activity", IEEE Trans on Circuits and Systems for Video Technology, vol. 19, pp. 491-499, March 2009.

SUMMARY OF INVENTION

Technical Problem

However, while an optimum solution can be obtained by comparing RD costs of all encoding modes and therefore a high degree of encoding efficiency can be achieved, there is a problem that an amount of calculation becomes enormous.

In other words, the technologies according to PTL 1 and NPL 2 reduce an amount of calculation by limiting other encoding modes from a skip RD cost. However, this method always needs to calculate a skip RD cost, and therefore processing of calculating a skip RD cost cannot be reduced even when a skip mode has a low possibility of being selected.

Further, the technologies according to PTL 1 and NPL 2 cannot also reduce calculation of an RD cost when a residual in the intra prediction mode and the inter prediction mode is removed, and therefore there is a problem that the amount of calculation cannot be sufficiently reduced.

Thus, a main object of the present invention is to provide a moving image encoding device, a moving image encoding method, and a moving image encoding program capable of determining an encoding mode through a small amount of calculation while suppressing deterioration in encoding efficiency.

Solution to Problem

In order to solve the problem described above, an aspect of a moving image encoding device includes encoding mode determining means for determining a combination of a plurality of encoding modes for each block according to the present invention, wherein the encoding mode determining means includes: mode ratio calculating means for calculating a prediction mode ratio of an encoding mode in a previously encoded frame; skip information determining means for comparing a preset ratio determining threshold with the prediction mode ratio, and predicting a pixel by using a reference frame and calculating a skip RD cost only when the prediction mode ratio is equal to or less than the ratio determining threshold (the prediction mode ratio≤the ratio determining threshold); intra prediction information determining means for predicting a block to be encoded by using an encoded pixel in a frame to be encoded, and calculating intra information and an intra RD cost; inter prediction information determining means for predicting a block to be encoded by using a pixel in the reference frame, and calculating motion information in the reference frame and calculating an inter RD cost; sub-block cost calculating means for acquiring a total of RD costs of sub-blocks generated by dividing the block; intra residual removal determining means for comparing the ratio determining threshold with the prediction mode ratio, determining whether or not there is a residual in an intra prediction mode acquired by the intra prediction information determining means only when the prediction mode ratio is equal to or less than the ratio determining threshold (the prediction mode ratio≤ the ratio determining threshold), and calculating an intra residual RD cost; inter residual removal determining means for comparing the ratio determining threshold with the prediction mode ratio, determining whether or not there is a residual in an inter prediction mode acquired by the inter prediction information determining means only when the prediction mode ratio is equal to or less than the ratio determining threshold (the prediction mode ratio≤ the ratio determining threshold), and calculating an inter residual RD cost; and mode determining means for comparing at least one RD cost among the intra residual RD cost, the inter residual RD cost, and the skip RD cost with the sub RD cost, selecting a minimum mode, and determining a prediction mode.

Further, an aspect of a moving image encoding method for determining a combination of a plurality of encoding modes for each block according to the present invention includes: calculating a prediction mode ratio of an encoding mode in a previously encoded frame; comparing a preset ratio determining threshold with the prediction mode ratio, and predicting a pixel by using a reference frame and calculating a skip RD cost only when the prediction mode ratio is equal to or less than the ratio determining threshold (the prediction mode ratio≤ the ratio determining threshold); predicting a block to be encoded by using the reference frame and calculating intra information and an intra RD cost; predicting a block to be encoded by using a pixel in the reference frame, encoding motion information and a prediction residual of the reference frame, and calculating an inter RD cost; acquiring a total of RD costs of sub-blocks generated by dividing the block; comparing the ratio determining threshold with the prediction mode ratio, determining whether or not there is a residual in an intra prediction mode only when the prediction mode ratio is equal to or less than the ratio determining threshold (the prediction mode ratio≤ the ratio determining threshold), and calculating an intra residual RD cost; comparing the ratio determining threshold with the prediction mode ratio, determining whether or not there is a residual in an inter prediction mode only when the prediction mode ratio is equal to or less than the ratio determining threshold (the prediction mode ratio≤ the ratio determining threshold), and calculating an inter residual RD cost; and comparing at least one RD cost among the intra residual RD cost, the inter residual RD cost, and the skip RD cost with the sub RD cost, selecting a minimum mode, and determining a prediction mode.

Furthermore, an aspect of a moving image encoding program that determines a combination of a plurality of encoding modes for each block according to the present invention includes the steps of: calculating a prediction mode ratio of an encoding mode in a previously encoded frame; comparing a preset ratio determining threshold with the prediction mode ratio, and predicting a pixel by using a reference frame and calculating a skip RD cost only when the prediction mode ratio is equal to or less than the ratio determining threshold (the prediction mode ratio≤ the ratio determining threshold); predicting a block to be encoded by using the reference frame and calculating intra information and an intra RD cost; predicting a block to be encoded by using a pixel in the reference frame, encoding motion information and a prediction residual of the reference frame, and calculating an inter RD cost; acquiring a total of RD costs of sub-blocks generated by dividing the block; comparing the ratio determining threshold with the prediction mode ratio, determining whether or not there is a residual in an intra prediction mode only when the prediction mode ratio is equal to or less than the ratio determining threshold (the prediction mode ratio≤ the ratio determining threshold), and calculating an intra residual RD cost; comparing the ratio determining threshold with the prediction mode ratio, determining whether or not there is a residual in an inter prediction mode only when the prediction mode ratio is equal to or less than the ratio determining threshold (the prediction mode ratio≤ the ratio determining threshold), and calculating an inter residual RD cost; and comparing at least one RD cost among the intra residual RD cost, the inter residual RD cost, and the skip RD cost with the sub RD cost, selecting a minimum mode, and determining a prediction mode.

Advantageous Effects of Invention

According to the present invention, when a possibility that a residual is to be zero is low, an amount of calculation in RD cost calculation in a skip mode or at a time of removing a residual can be reduced, and a speed of moving image encoding processing can be enhanced.

EXAMPLE EMBODIMENT

A principal feature of the present invention is that an amount of calculation needed to calculate an RD cost is reduced by determining whether or not a possibility that a residual is to be zero is low and determining, when the possibility is low, an encoding mode without calculating an RD cost in a case where a residual is compulsorily set to zero. Further, since a skip mode is a prediction mode of setting all residuals to zero and using a specific motion vector, a principal feature of the present invention is that the amount of calculation needed for an RD cost is reduced by also performing the same determination on the skip mode. At this time, a possibility that a residual is to be zero is determined by using a ratio of an encoding mode in an encoded frame (a prediction mode ratio). Details will be described below.

Note that, a moving image encoding device, a moving image encoding method, and a moving image encoding program according to the present invention can reduce an amount of calculation while maintaining encoding efficiency and can thus achieve high-speed processing of a high-resolution image, thereby being a technology useful to a capturing system, a transcoding system, and the like that require high-resolution processing.

First Example Embodiment

Figure 1:
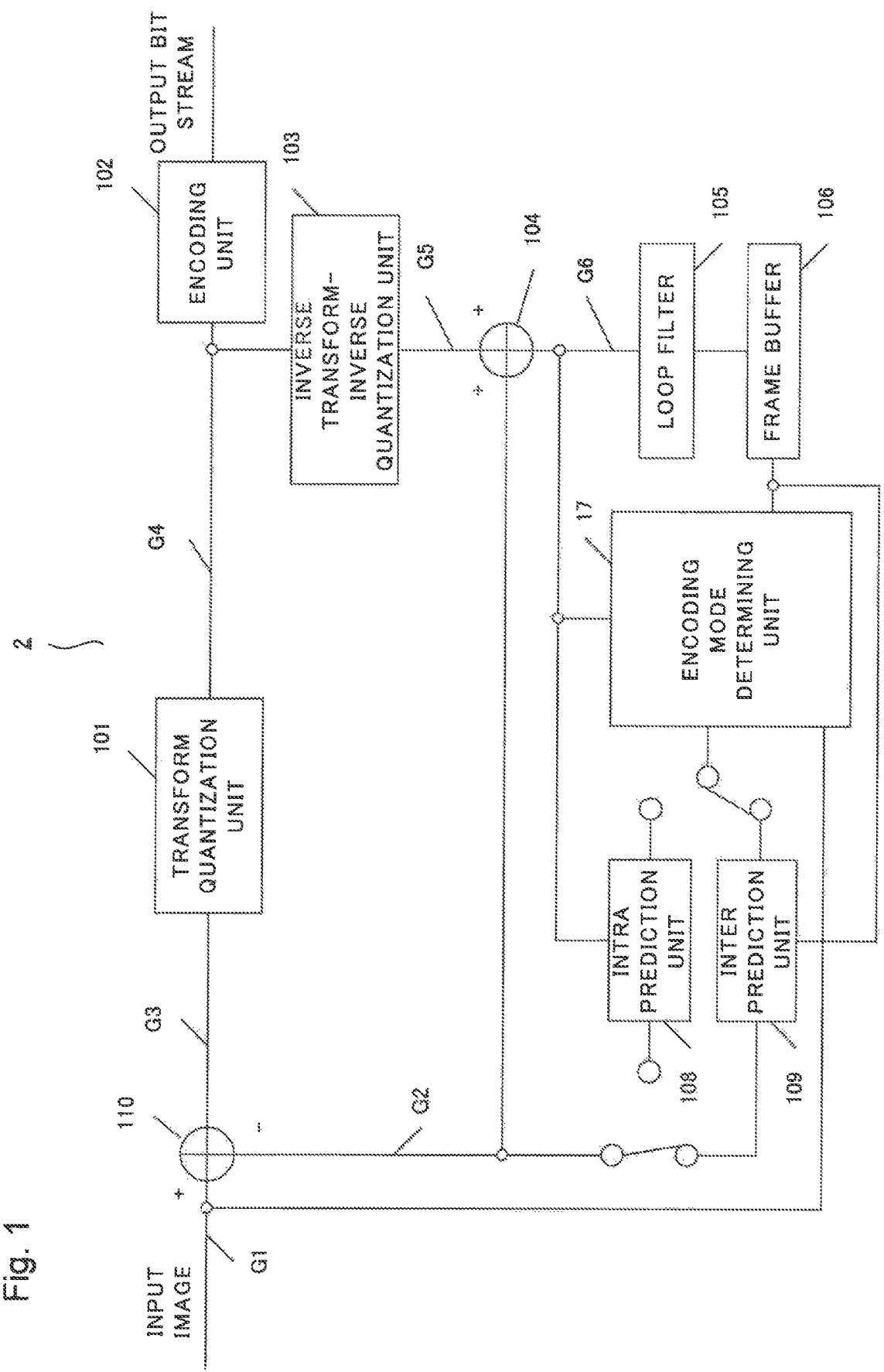
FIG. 1 is a block diagram of a moving image encoding device according to a first example embodiment.

A first example embodiment of the present invention will be described. FIG. 1 is a block diagram of a moving image encoding device 2 according to the present example embodiment. The moving image encoding device 2 includes a transform quantization unit 101, an encoding unit 102, an inverse transform-inverse quantization unit 103, a synthesizer 104, a loop filter 105, a frame buffer 106, an encoding mode determining unit 17, an intra prediction unit 108, an inter prediction unit 109, and an adder 110.

Figure 2:
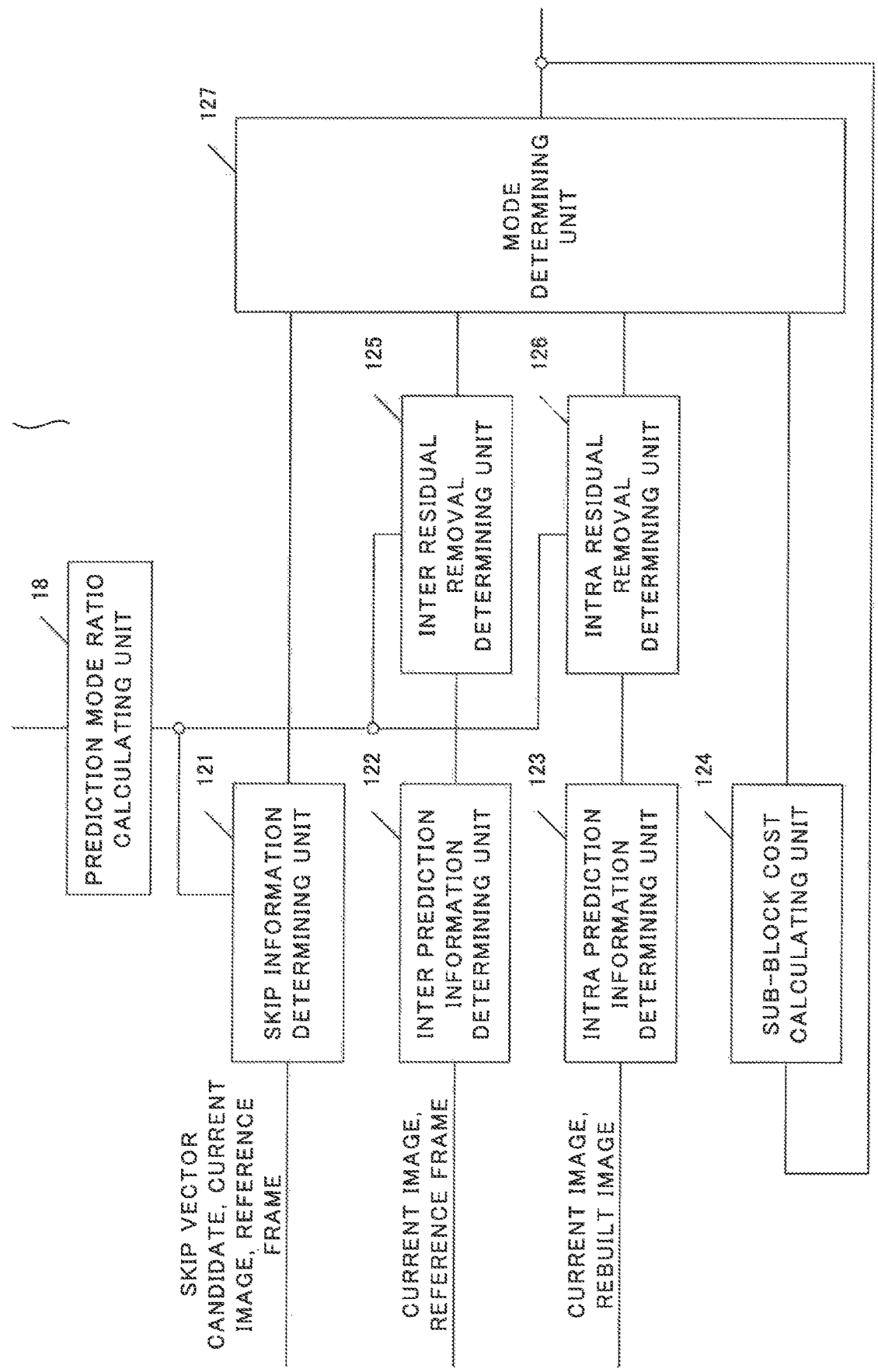
FIG. 2 is a block diagram of an encoding mode determining unit.

The moving image encoding device 2 has substantially the same block configuration as that of the moving image encoding device 100 described earlier by using FIG. 6, but the encoding mode determining unit 17 has a different internal configuration. FIG. 2 is a block diagram of the encoding mode determining unit 17.

The encoding mode determining unit 17 includes a skip information determining unit 121, an inter prediction information determining unit 122, an intra prediction information determining unit 123, a sub-block cost calculating unit 124, an inter residual removal determining unit 125, an intra residual removal determining unit 126, a mode determining unit 127, and a prediction mode ratio calculating unit 18. In other words, the encoding mode determining unit 17 has the configuration of the encoding mode determining unit 107 illustrated in FIG. 7 to which the prediction mode ratio calculating unit 18 is added.

Figure 6:
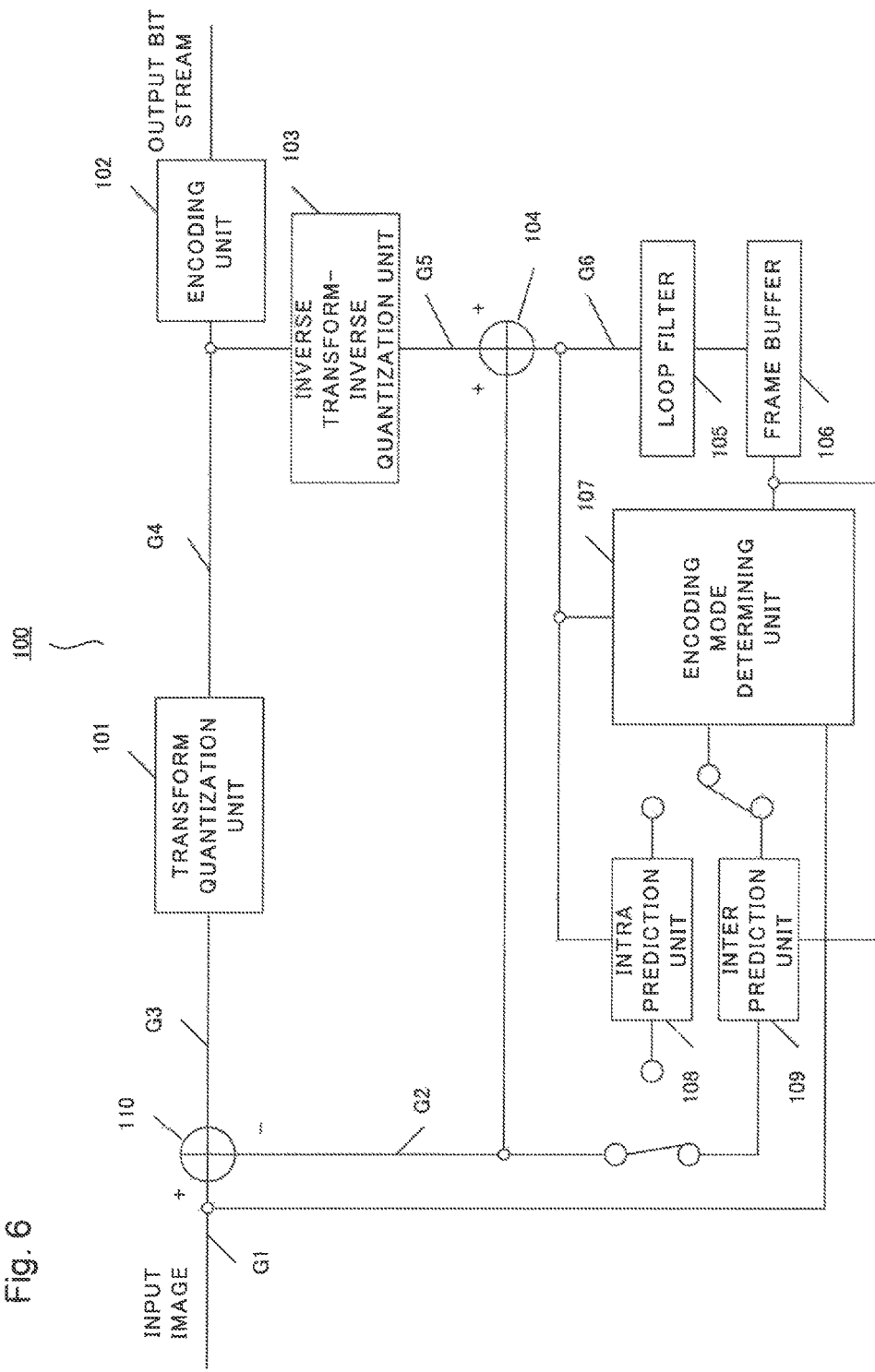
FIG. 6 is a diagram illustrating an example of a configuration of a moving image encoding device based on a H.265 standard, which is applied to description of the related art.
Figure 7:
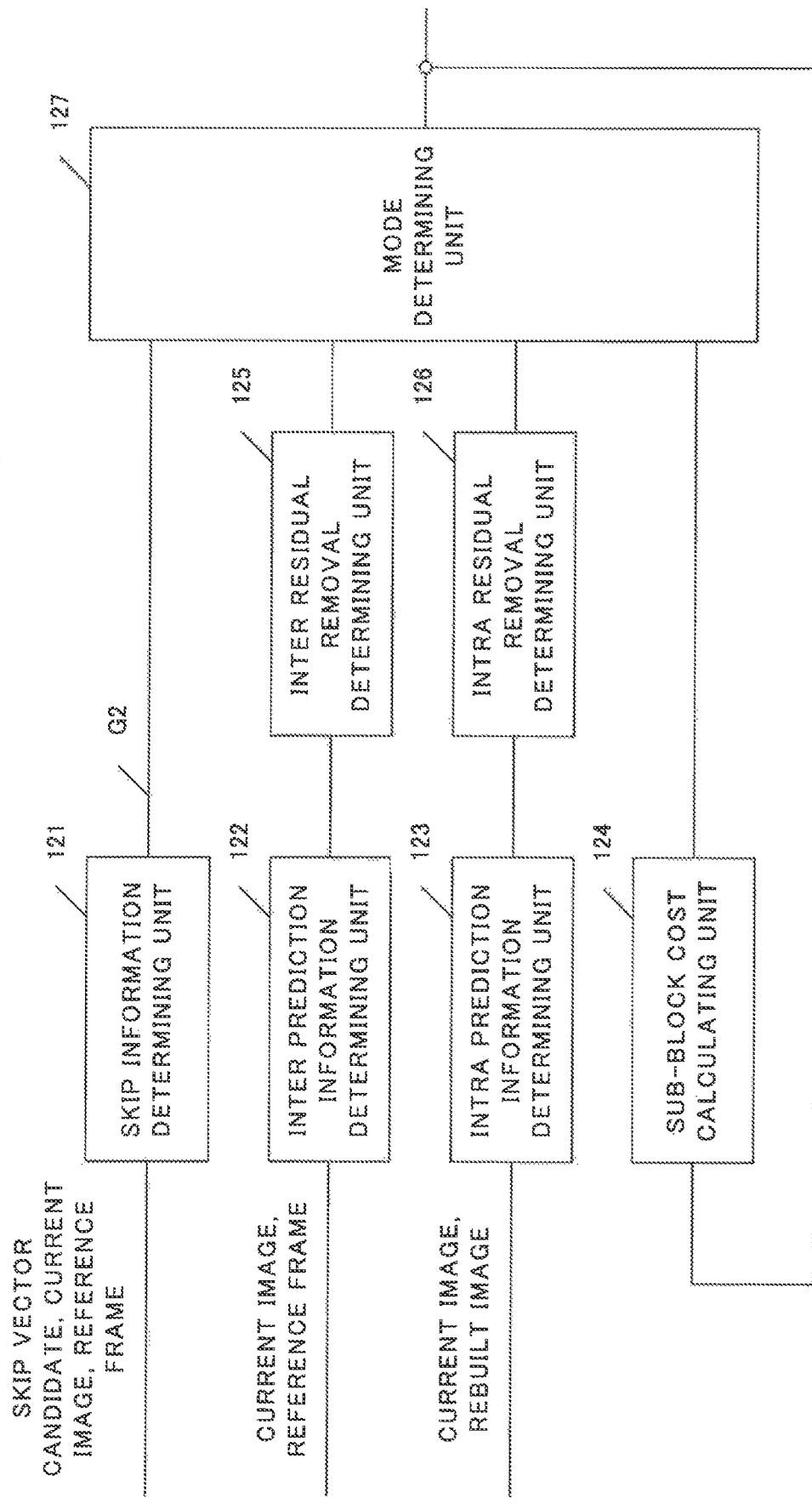
FIG. 7 is a block diagram of an encoding mode determining unit.

Hereinafter, the same configuration as that in FIGS. 6 and 7 has the same reference, and description thereof is appropriately omitted.

Figure 3:
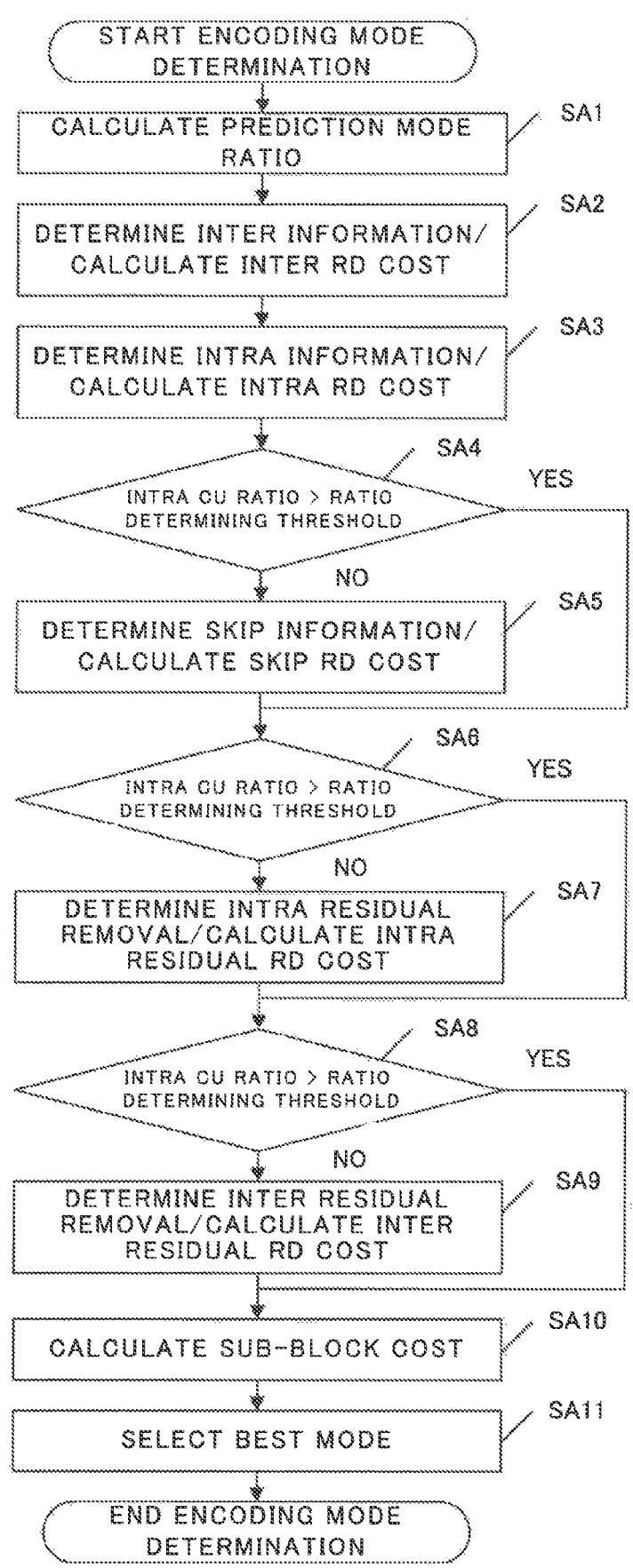
FIG. 3 is a flowchart illustrating encoding mode determining processing in the encoding mode determining unit.

An operation of the encoding mode determining unit 17 will be described. FIG. 3 is a flowchart illustrating encoding mode determining processing in the encoding mode determining unit 17.

Step SA1: First, the prediction mode ratio calculating unit 18 calculates a prediction mode ratio (for example, an intra CU ratio) in one or more encoded frames. A reference frame is a frame included in the encoded frames, and is stored in a storage means such as a register, which is not illustrated, of the encoding mode determining unit 17 every time encoding processing is performed such that the reference frame can be updated. The calculated prediction mode ratio is output to the skip information determining unit 121, the inter residual removal determining unit 125, and the intra residual removal determining unit 126. Note that, the prediction mode ratio may be calculated by targeting an encoded CU in a frame to be encoded.

Steps SA2 and SA3: The inter prediction information determining unit 122 determines motion information by performing a motion vector search and calculates an inter RD cost corresponding to the determined motion information. Further, the intra prediction information determining unit 123 determines an intra prediction direction and calculates an intra RD cost corresponding to the determined intra prediction direction.

Note that, an RD cost is obtained by a sum of squared error (SSE) of a residual of a current image and the rebuilt image G6 and an amount of codes, but another indicator such as a sum of absolute difference (SAD) of a residual of a current image and the prediction image G2 may be used.

Steps SA4 and SA5: Next, the skip information determining unit 121 compares the prediction mode ratio with a predetermined ratio determining threshold stored in the skip information determining unit 121. Note that, the ratio determining threshold is stored in each of the skip information determining unit 121, the inter residual removal determining unit 125, and the intra residual removal determining unit 126. The ratio determining threshold is preferably determined statistically such that all the amount of calculation in encoding mode determination can be reduced and encoding efficiency is not lowered. Further, the ratio determining threshold may be changed according to an encoding condition and an encoding scene and may be set to a value that varies by brightness or a color difference.

When the intra CU ratio is greater than the ratio determining threshold (the intra CU ratio>the ratio determining threshold) in the comparison, the processing proceeds to Step SA6. On the other hand, when the intra CU ratio is equal to or less than the ratio determining threshold (the intra CU ratio≤ the ratio determining threshold), the processing proceeds to Step SA5, and the skip information determining unit 121 determines skip information and calculates a skip RD cost.

Steps SA6 to SA9: Next, the intra residual removal determining unit 126 compares the prediction mode ratio with a predetermined ratio determining threshold stored in the intra residual removal determining unit 126. Then, when the intra CU ratio is greater than the ratio determining threshold (the intra CU ratio>the ratio determining threshold), processing of determining an intra residual removal and calculating an intra residual RD cost is not performed. On the other hand, when the intra CU ratio is equal to or less than the ratio determining threshold (the intra CU ratio≤the ratio determining threshold), processing of determining an intra residual removal and calculating an intra residual RD cost is performed.

Similarly, the inter residual removal determining unit 125 also compares the prediction mode ratio with a ratio determining threshold stored in the inter residual removal determining unit 125. As a result, when the intra CU ratio is greater than the ratio determining threshold (the intra CU ratio>the ratio determining threshold), processing of determining an inter residual removal and calculating an inter residual RD cost is not performed. On the other hand, when the intra CU ratio is equal to or less than the ratio determining threshold (the intra CU ratio≤ the ratio determining threshold), processing of determining an inter residual removal and calculating an inter residual RD cost is performed.

In this way, whether or not processing in each of the skip information determining unit 121, the inter residual removal determining unit 125, and the intra residual removal determining unit 126 will be wasted is determined before execution of each processing by calculating an intra CU ratio and comparing the intra CU ratio with a ratio determining threshold. Thus, an amount of calculation can be reduced.

In other words, the intra prediction mode generally has a greater amount of residuals than that of the inter prediction mode. Thus, a residual increases and a residual removal mode and a skip mode have a low possibility of being selected in a situation where the intra prediction mode is frequent. Therefore, the amount of calculation needed for RD cost calculation or the like can be reduced by omitting the skip information determining unit 121, the inter residual removal determining unit 125, and the intra residual removal determining unit 126 that perform processing on a mode having a low possibility of being selected. At this time, processing of calculating an intra CU ratio is newly needed, but such calculation processing may be performed once on one to several frames, so that an amount of calculation increased is negligible compared with the amount of calculation that can be reduced by the above-mentioned determination processing.

Step SA10: Next, the sub-block cost calculating unit 124 obtains a total of sub RD costs of CUs generated by dividing a processing target CU into a plurality of units (sub-blocks). The sub RD cost calculation is encoding mode determining processing in a sub-block and may be processed recursively.

Step SA11: Subsequently, the mode determining unit 127 compares each RD cost in the presence or absence of a residual in each of the sub-block, the skip mode, the intra prediction mode, and the inter prediction mode, and selects a mode having the smallest cost. The RD cost of the selected mode is a cost of a sub-block of a CU at one higher rank.

Note that, the description above is described by taking an intra CU ratio as an example of a prediction mode ratio. The reason is that, it is taken into consideration that generally in the intra CU ratio the intra prediction mode has a great amount of residuals. Thus, an inter ratio may be used as a prediction mode ratio in a system where, for example, the inter prediction mode has a great amount of residuals.

Further, the description above presents the case where processing of comparing an intra CU ratio with a ratio determining threshold is performed in order of the skip information determining unit 121, the intra residual removal determining unit 126, and the inter residual removal determining unit 125, but the procedure may be parallel processing. In other words, priorities in processing are not assigned to Steps SA4 and SA5, Steps SA6 and SA7, and Steps SA8 and SA9.

As described above, a prediction mode ratio is compared with a ratio determining threshold, and processing having a low possibility of being selected according to the comparison result is not performed, therefore an encoding mode can be determined through a small amount of calculation while a deterioration in encoding efficiency is suppressed.

Second Example Embodiment

Next, a second example embodiment of the present invention will be described. Note that, the same configuration as that in the first example embodiment has the same reference, and description thereof is appropriately omitted.

In the present example embodiment, processing of calculating another RD cost is omitted according to an RD cost in a specific mode as in PTL 1, and processing of calculating a skip RD cost can also be omitted according to an intra block ratio (intra CU ratio).

Note that, in the following description, a case where a block size is changed from 4×4 to 16×16 similarly to PTL 1 described to target H.264 is described as an example, but a remark is intentionally made that the present example embodiment is also applicable to H.265 having the block size expanded to 64×64 as a matter of course.

Figure 4:
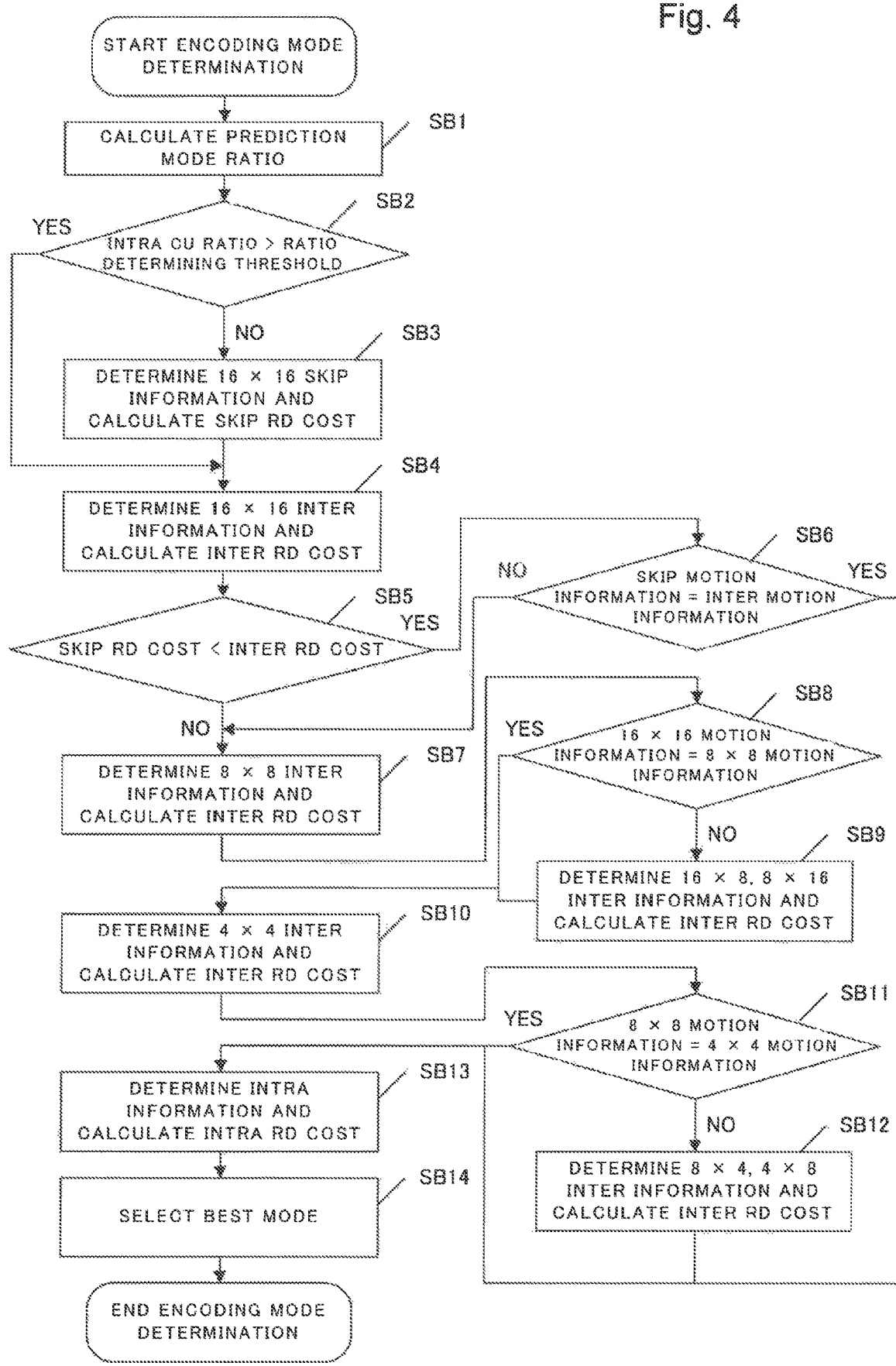
FIG. 4 is a flowchart illustrating encoding mode determining processing in an encoding mode determining unit according to a second example embodiment.

FIG. 4 is a flowchart illustrating encoding mode determining processing in the encoding mode determining unit 17 according to the present example embodiment.

Step SB1: First, a prediction mode ratio (herein, an intra CU ratio) in an encoded frame calculated by the prediction mode ratio calculating unit 18 is calculated.

Steps SB2 and SB3: Then, the skip information determining unit 121 compares the intra CU ratio with a ratio determining threshold. When the comparison result is the intra CU ratio≤ the ratio determining threshold, the skip information determining unit 121 calculates a skip RD cost corresponding to a 16×16 skip vector.

On the other hand, when the intra CU ratio>the ratio determining threshold, the skip information determining unit 121 determines that the skip RD cost calculation is not needed, and the processing proceeds to Step SB4. A maximum value which the skip RD cost may take is previously set.

Steps SB4 and SB5: Next, the inter prediction information determining unit 122 performs a motion vector search in 16×16 blocks, determines information in the inter prediction mode, and calculates an inter RD cost. Then, the inter prediction information determining unit 122 compares the skip RD cost with the inter RD cost. Note that, when the intra CU ratio>the ratio determining threshold in Step SB2, the skip RD cost is equal to or greater than the inter RD cost in Step SB5 and the processing proceeds to Step SB7.

Step SB6: On the other hand, when the skip RD cost is smaller than the inter RD cost in the 16×16 blocks, it is determined whether or not skip motion information is the same as 16×16 inter motion information. When the skip motion information is equal to the inter motion information by the determination, processing of calculating an inter RD cost of another block size is omitted, and the processing proceeds to Step SB13. In other words, when the skip motion information in the 16×16 blocks is equal to the inter motion information, the processing proceeds to Step SB13, and calculation of an inter RD cost in 8×8 blocks and 4×4 blocks is omitted.

Steps SB7 and SB8: When the skip motion information in the 16×16 blocks is not equal to the inter motion information, the inter prediction information determining unit 122 changes the block size to 8×8, determines information in the inter prediction mode by a motion vector search, and calculates an inter RD cost. Then, the inter prediction information determining unit 122 determines whether or not motion information in the 8×8 blocks (8×8 motion information) is equal to motion information in the 16×16 blocks (16×16 motion information).

Step SB9: When the 8×8 motion information is equal to the 16×16 motion information, the inter prediction information determining unit 122 determines information in the inter prediction mode in each of 16×8 blocks and 8×16 blocks and calculates an inter RD cost.

Steps SB10 and SB11: When it is determined that the 16×16 motion information is not equal to the 8×8 motion information in Step SB8 or when an inter RD cost in the 16×8 and 8×16 blocks is calculated in Step SB9, the inter prediction information determining unit 122 determines information in the inter prediction mode in 4×4 blocks and calculates an inter RD cost. Then, it is determined whether or not the 8×8 motion information is equal to the 4×4 motion information.

Step SB12: At this time, when the 8×8 motion information is not equal to the 4×4 motion information, the inter prediction information determining unit 122 determines information in the inter prediction mode in 8×4 and 4×8 blocks and calculates an inter RD cost.

Steps SB13 and SB14: When the 8×8 motion information is equal to the 4×4 motion information and when an intra RD cost in the 8×4 and 4×8 blocks is calculated in Step SB12, the processing in the inter prediction mode is completed. Then, the intra prediction information determining unit 123 determines a prediction direction in the intra prediction mode in each of the block sizes and calculates an intra RD cost, and the mode determining unit 127 selects a mode having the smallest intra RD cost.

Residual removal determination is not described in the example of FIG. 4, but an inter residual RD cost obtained by removing a residual in the intra prediction mode and the inter prediction mode of each size may be compared similarly to the first example embodiment, and a need for the residual removal determination may be determined according to an intra CU ratio.

As described above, when a possibility of selecting a skip mode is low even in the encoding mode determining processing in which calculation of an RD cost in another mode is omitted according to a relationship between a skip RD cost and an inter RD cost, calculation of a skip RD cost can be reduced.

Third Example Embodiment

Next, a third example embodiment of the present invention will be described. Note that, the same configuration as that in each of the above-described example embodiments has the same reference, and description thereof is appropriately omitted.

In NPL 2, a skip RD cost is first evaluated, and when the skip RD cost is equal to or less than a threshold for skip determination (skip determination threshold), a skip mode is determined without evaluating other modes. In this way, when a cost in the skip mode is equal to or less than a skip determination threshold, an amount of calculation can be greatly reduced.

However, when a skip determination threshold is not set to an appropriate value in the method, a skip mode is easily selected to an excessive degree in some cases. However, a cost is not compared with that in another encoding mode, therefore encoding efficiency deteriorates.

Thus, in the present example embodiment, a skip determination threshold is properly set, and therefore a deterioration in encoding efficiency is suppressed in addition to reducing an amount of calculation in skip RD cost calculation. Note that, a case where the block size is changed from 4×4 to 16×16 similarly to the second example embodiment will be described below.

Figure 5:
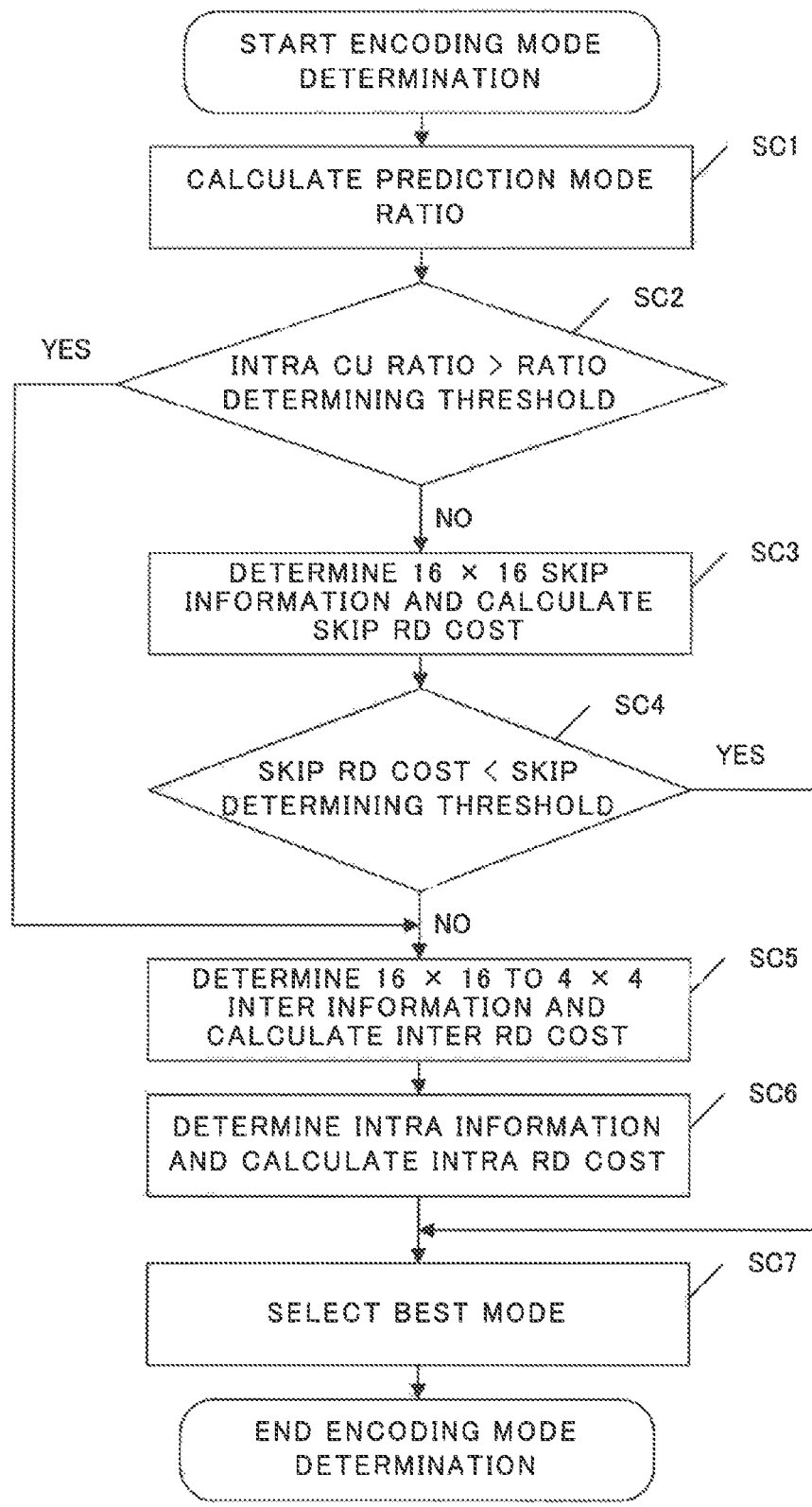
FIG. 5 is a flowchart illustrating encoding mode determining processing in an encoding mode determining unit according to a third example embodiment.

FIG. 5 is a flowchart illustrating encoding mode determining processing in the encoding mode determining unit 17 according to the present example embodiment.

Step SC1: First, a prediction mode ratio (herein, an intra CU ratio) in an encoded frame calculated by the prediction mode ratio calculating unit 18 is calculated.

Steps SC2 and SC3: Then, the skip information determining unit 121 compares the intra CU ratio with a ratio determining threshold.

Further, when the intra CU ratio is greater than the ratio determining threshold, the processing proceeds to Step SC5. In other words, processing in Steps SC3 and SC4 is skipped. In this way, calculation of a skip RD cost can be reduced. On the other hand, when the intra CU ratio≤the ratio determining threshold, the processing proceeds to Step SC3.

Steps SC3 and SC4: When the intra CU ratio is equal to or less than the ratio determining threshold, the skip information determining unit 121 determines skip information in 16×16 blocks and calculates a skip RD cost in a 16×16 skip mode. Then, the skip information determining unit 121 compares the skip RD cost with a previously set skip determining threshold. Note that, the skip determining threshold is preferably determined statistically in such a way as to satisfy both of a reduction in an amount of calculation and enhancement of encoding efficiency.

When the intra CU ratio is equal to or less than the ratio determining threshold, the processing proceeds to Step SC5, but when the skip RD cost is less than the skip determining threshold, the processing proceeds to Step SC7.

When the skip RD cost is less than the skip determining threshold, it means that a skip mode has a high possibility of being selected. Thus, the processing in Steps SC5 and SC6 is skipped, and processing of determining inter information and calculating an inter RD cost and processing of determining intra information and calculating an intra cost can be omitted. In other words, when the skip RD cost is less than the skip determining threshold, an RD cost in a mode other than the skip mode is calculated, and when the skip RD cost is equal to or greater than the skip determining threshold, only the skip mode is performed and an RD cost in another mode is not calculated.

Steps SC5 and SC6: Then, when the skip RD cost is equal to or greater than the skip determining threshold, the skip information determining unit 121 determines inter information in 16×16 to 4×4 blocks and calculates an inter RD cost. Further, the intra prediction information determining unit 123 determines intra information and calculates an intra RD cost.

Step SC7: The mode determining unit 127 determines the best mode from the RD costs calculated by the procedure so far.

As described above, calculation of an RD cost in another mode can be omitted according to a relationship between a skip determining threshold and a skip RD cost, and calculation of a skip RD cost can be reduced.

Further, processing of determining whether or not to perform comparison determination between a skip RD cost and a skip determining reference can be selected by comparing an intra CU ratio with a ratio determining threshold. This can thus prevent a skip mode from being selected to an excessive degree in a scene with many intra CUs and an RD cost in another mode from not being calculated, therefore encoding efficiency can be enhanced.

Residual removal determination is not described in the description above, but an RD cost obtained by removing a residual in the intra prediction mode and the inter prediction mode of each size may be compared similarly to the first example embodiment.

Note that, the above-mentioned mode selection processing may be previously coded in a program and may also be recorded in an information recording medium that is computer-readable and implementable.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

2 Moving image encoding device
17 Encoding mode determining unit
18 Prediction mode ratio calculating unit
101 Transform quantization unit
102 Encoding unit
103 Inverse transform-inverse quantization unit
104 Synthesizer
105 Loop filter
106 Frame buffer
107 Encoding mode determining unit
108 Intra prediction unit
109 Inter prediction unit
110 Adder
121 Skip information determining unit
122 Inter prediction information determining unit
123 Intra prediction information determining unit
124 Sub-block cost calculating unit
125 Inter residual removal determining unit
126 Intra residual removal determining unit
127 Mode determining unit

The invention claimed is:

1. A moving image encoding device comprising:
a processor; and
a non-transitory storage medium storing executable instructions that, when executed by the processor, causes the processor to perform as an encoding mode determining unit for determining a combination of a plurality of encoding modes for each block, wherein
the encoding mode determining unit comprises:
  a mode ratio calculating unit for calculating a prediction mode ratio of an encoding mode in a previously encoded frame;
  a skip information determining unit for comparing a preset ratio determining threshold with the prediction mode ratio, and predicting a pixel by using a reference frame and calculating a skip RD cost of a block to be encoded only when the prediction mode ratio is equal to or less than the ratio determining threshold (the prediction mode ratio≤the ratio determining threshold);
  an intra prediction information determining unit for predicting the block to be encoded by using an encoded pixel in a frame to be encoded, and calculating intra information and an intra RD cost;
  an inter prediction information determining unit for predicting the block to be encoded by using a pixel in the reference frame, and calculating motion information in the reference frame and calculating an inter RD cost;
  a sub-block cost calculating unit for acquiring a total of RD costs of sub-blocks generated by dividing the block to be encoded;
  an intra residual removal determining unit for comparing the ratio determining threshold with the prediction mode ratio, determining whether or not there is a residual in an intra prediction mode acquired by the intra prediction information determining unit only when the prediction mode ratio is equal to or less than the ratio determining threshold (the prediction mode ratio≤the ratio determining threshold), and calculating an intra residual RD cost;
  an inter residual removal determining unit for comparing the ratio determining threshold with the prediction mode ratio, determining whether or not there is a residual in an inter prediction mode acquired by the inter prediction information determining unit only when the prediction mode ratio is equal to or less than the ratio determining threshold (the prediction mode ratio≤the ratio determining threshold), and calculating an inter residual RD cost; and
  a mode determining unit for comparing each of the RD costs among the intra residual RD cost, the inter residual RD cost, and the skip RD cost with the total of RD costs of sub-blocks, selecting the encoding mode having the minimum RD cost as the encoding mode of the block to be encoded,
wherein the mode ratio calculating unit, skip information determining unit, intra prediction information determining unit, inter prediction information determining unit, sub-block cost calculating unit, intra residual removal determining unit, inter residual removal determining unit and the mode determining unit are implemented by executable instructions stored in the non-transitory storage medium and executed by the processor.

2. The moving image encoding device according to claim 1, wherein
the prediction mode ratio is a ratio of the block predicted in the intra prediction information determining unit.

3. The moving image encoding device according to claim 1, wherein
the prediction mode ratio is a ratio of the block in which the residual is zero.

4. The moving image encoding device according to claim 1, wherein
the ratio determining threshold is set to a value that varies depending on brightness or color difference.

5. A moving image encoding method for determining a combination of a plurality of encoding modes for each block, the method comprising:
calculating a prediction mode ratio of an encoding mode in a previously encoded frame;
comparing a preset ratio determining threshold with the prediction mode ratio, and predicting a pixel by using a reference frame and calculating a skip RD cost of a block to be encoded only when the prediction mode ratio is equal to or less than the ratio determining threshold (the prediction mode ratio≤the ratio determining threshold);
predicting the block to be encoded by using the reference frame and calculating intra information and an intra RD cost;
predicting the block to be encoded by using a pixel in the reference frame, calculating motion information in the reference frame, and calculating an inter RD cost;
acquiring a total of RD costs of sub-blocks generated by dividing the block to be encoded;
comparing the ratio determining threshold with the prediction mode ratio, determining whether or not there is a residual in an intra prediction mode only when the prediction mode ratio is equal to or less than the ratio determining threshold (the prediction mode ratio≤the ratio determining threshold), and calculating an intra residual RD cost;
comparing the ratio determining threshold with the prediction mode ratio, determining whether or not there is a residual in an inter prediction mode only when the prediction mode ratio is equal to or less than the ratio determining threshold (the prediction mode ratio≤the ratio determining threshold), and calculating an inter residual RD cost; and
comparing each of the RD costs among the intra residual RD cost, the inter residual RD cost, and the skip RD cost with the total of RD costs of sub-blocks, selecting the encoding mode having the minimum RD cost as the encoding mode of the block to be encoded.

6. The moving image encoding method according to claim 5, wherein
the prediction mode ratio is a ratio of the block predicted in the intra prediction mode.

7. The moving image encoding method according to claim 5, wherein
the prediction mode ratio is a ratio of the block in which the residual is zero.

8. The moving image encoding method according to claim 5, wherein
the ratio determining threshold is set to a value that varies depending on brightness or color difference.

9. A non-transitory storage medium for storing a moving image encoding program that when executed in a computer determines a combination of a plurality of encoding modes for each block, the program comprising:
calculating a prediction mode ratio of an encoding mode in a previously encoded frame;
comparing a preset ratio determining threshold with the prediction mode ratio, and predicting a pixel by using a reference frame and calculating a skip RD cost of a block to be encoded only when the prediction mode ratio is equal to or less than the ratio determining threshold (the prediction mode ratio≤the ratio determining threshold);
predicting the block to be encoded by using the reference frame and calculating intra information and an intra RD cost;
predicting the block to be encoded by using a pixel in the reference frame, calculating motion information in the reference frame, and calculating an inter RD cost;
acquiring a total of RD costs of sub-blocks generated by dividing the block;
comparing the ratio determining threshold with the prediction mode ratio, determining whether or not there is a residual in an intra prediction mode only when the prediction mode ratio is equal to or less than the ratio determining threshold (the prediction mode ratio≤the ratio determining threshold), and calculating an intra residual RD cost;
comparing the ratio determining threshold with the prediction mode ratio, determining whether or not there is a residual in an inter prediction mode only when the prediction mode ratio is equal to or less than the ratio determining threshold (the prediction mode ratio≤the ratio determining threshold), and calculating an inter residual RD cost; and
comparing each of the RD costs among the intra residual RD cost, the inter residual RD cost, and the skip RD cost with the total of RD costs of sub-blocks, selecting the encoding mode having the minimum RD cost as the encoding mode of the block to be encoded.

10. The non-transitory storage medium for storing the moving image encoding program according to claim 9, wherein
the prediction mode ratio is a ratio of the block predicted in the intra prediction mode or a ratio of the block in which the residual is zero.

* * * * *